United States Patent
Lee et al.

(10) Patent No.: US 12,035,754 B2
(45) Date of Patent: Jul. 16, 2024

(54) AEROSOL GENERATING DEVICE AND OPERATION METHOD THEREOF

(71) Applicant: KT&G CORPORATION, Daejeon (KR)

(72) Inventors: Jae Min Lee, Gyeonggi-do (KR); Jong Sub Lee, Gyeonggi-do (KR); Dong Bum Kwon, Seoul (KR); Jin Soo Seong, Seoul (KR)

(73) Assignee: KT&G CORPORATION, Daejeon (KR)

( * ) Notice: Subject to any disclaimer, the term of this patent is extended or adjusted under 35 U.S.C. 154(b) by 868 days.

(21) Appl. No.: 17/056,221

(22) PCT Filed: Jul. 13, 2020

(86) PCT No.: PCT/KR2020/009208
§ 371 (c)(1),
(2) Date: Nov. 17, 2020

(87) PCT Pub. No.: WO2021/020768
PCT Pub. Date: Feb. 4, 2021

(65) Prior Publication Data
US 2022/0183382 A1    Jun. 16, 2022

(30) Foreign Application Priority Data

Jul. 30, 2019 (KR) .................. 10-2019-0092653

(51) Int. Cl.
*A24F 40/51* (2020.01)
*A24F 40/42* (2020.01)
(Continued)

(52) U.S. Cl.
CPC .............. *A24F 40/51* (2020.01); *A24F 40/42* (2020.01); *A24F 40/53* (2020.01); *A24F 40/60* (2020.01)

(58) Field of Classification Search
CPC .......... A24F 40/51; A24F 40/42; A24F 40/53; A24F 40/60; A24F 40/50; A24F 40/10; Y02E 60/10; H01M 10/488
See application file for complete search history.

(56) References Cited

U.S. PATENT DOCUMENTS 10,130,123 B2    11/2018 Hatton et al.
10,159,279 B2    12/2018 Lord et al.
(Continued)

FOREIGN PATENT DOCUMENTS

CN    105611847 A    5/2016
CN    107734983 A    2/2018
(Continued)

OTHER PUBLICATIONS

Communication dated Aug. 13, 2021, issued by the Korean Intellectual Property Office in application No. 10-2019-0092653.
(Continued)

*Primary Examiner* — Jean F Duverne
(74) *Attorney, Agent, or Firm* — Sughrue Mion, PLLC

(57) ABSTRACT

An aerosol generating device includes a heater for heating an aerosol generating material, a battery for supplying power to the heater, and a controller, and reduces unnecessary power consumption by detecting the moment of actual use of the aerosol generating device and resetting or updating the baseline of a puff sensor only for such actual use.

9 Claims, 7 Drawing Sheets

(51) Int. Cl.
*A24F 40/53* (2020.01)
*A24F 40/60* (2020.01)

(56) References Cited

U.S. PATENT DOCUMENTS

| | | |
|---|---|---|
| 10,701,973 B2 | 7/2020 | Lee |
| 10,757,973 B2 | 9/2020 | Alarcon et al. |
| 2016/0242466 A1 | 8/2016 | Lord et al. |
| 2016/0302488 A1 | 10/2016 | Fernando et al. |
| 2016/0374397 A1 | 12/2016 | Jordan et al. |
| 2017/0020191 A1 | 1/2017 | Lamb et al. |
| 2018/0177234 A1 | 6/2018 | Lee |
| 2019/0059448 A1 | 2/2019 | Talon |
| 2019/0133198 A1 | 5/2019 | Nakano et al. |
| 2019/0274359 A1 | 9/2019 | Jain et al. |
| 2020/0352231 A1 | 11/2020 | Han et al. |
| 2020/0352244 A1 | 11/2020 | Lim et al. |

FOREIGN PATENT DOCUMENTS

| | | | |
|---|---|---|---|
| CN | 108143009 A | 6/2018 | |
| CN | 208192124 U | 12/2018 | |
| CN | 109561732 A | 4/2019 | |
| EP | 3320790 A1 * | 5/2018 | ........... A24B 15/167 |
| EP | 3320790 A1 | 5/2018 | |
| JP | 2016-533712 A | 11/2016 | |
| JP | 2018-527906 A | 9/2018 | |
| KR | 10-1069342 B1 | 10/2011 | |
| KR | 10-1573101 B1 | 11/2015 | |
| KR | 10-2016-0086118 A | 7/2016 | |
| KR | 20-0483852 Y1 | 7/2017 | |
| KR | 10-2018-0111460 A | 10/2018 | |
| KR | 20180111460 A * | 10/2018 | |
| KR | 10-2019-0033081 A | 3/2019 | |
| KR | 10-2019-0039796 A | 4/2019 | |
| WO | 2010/003480 A1 | 1/2010 | |

OTHER PUBLICATIONS

Office Action issued Apr. 28, 2023 in Chinese Application No. 202080004363.6.
Supplementary European Search Report issued Feb. 2, 2022 in European Application No. 20804158.2.
Office Action issued Jan. 11, 2022 in Japanese Application No. 2020-571391.
International Search Report dated Dec. 30, 2020 in Application No. PCT/KR2020/009208.
Communication dated Dec. 15, 2020 from the Korean Intellectual Property Office in Application No. 10-2019-0092653.

* cited by examiner

AEROSOL GENERATING DEVICE AND OPERATION METHOD THEREOF

CROSS REFERENCE TO RELATED APPLICATIONS

This application is a National Stage of International Application No. PCT/KR2020/009208, filed Jul. 13, 2020, claiming priority to Korean Patent Application No. 10-2019-0092653, filed Jul. 30, 2019.

TECHNICAL FIELD

One or more embodiments of the present disclosure relate to an aerosol generating device and an operation method thereof.

BACKGROUND ART

Recently, the demand for alternatives to traditional combustive cigarettes has increased. For example, there is growing demand for aerosol generating devices that generate aerosol by heating an aerosol generating material, rather than by combusting cigarettes.

In general, a puff sensor for recognizing user's inhalation (i.e., puff), is included in an aerosol generating device. However, since the puff sensor is sensitive to environmental changes, for example, temperature changes, the baseline (i.e., reference values) of the puff sensor needs to be frequently reset to reduce errors caused by such environmental changes.

Therefore, unnecessary power may be consumed to reset the baseline of the puff sensor frequently while the aerosol generating device is operating.

DISCLOSURE

Technical Solution

One or more embodiments of the present disclosure provide an aerosol generating device that detects whether it is in actual use (e.g., whether a user is manipulating the aerosol generating device) and resets or update the baseline of its puff sensor only when such actual use is detected.

Advantageous Effects

According to an embodiment of the present disclosure, power consumption of an aerosol generating device may be reduced.

BEST MODE

Figure 1:
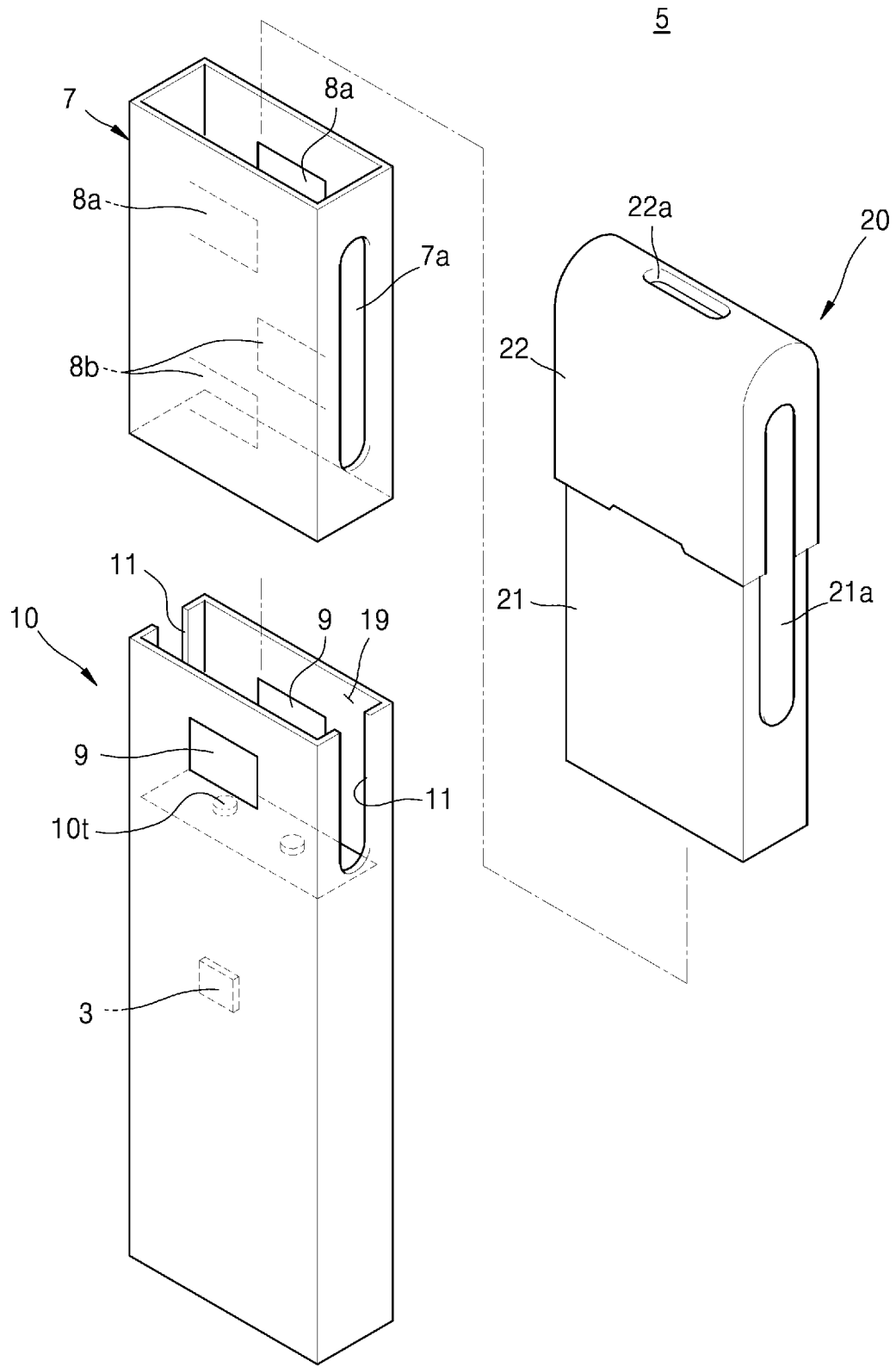
FIG. 1 is an exploded perspective view schematically illustrating a coupling relationship between a replaceable cartridge containing an aerosol generating material and an aerosol generating device including the same, according to an embodiment.

According to an aspect of the present disclosure, an aerosol generating device includes: a heater configured to heat an aerosol generating material; a battery configured to supply power to the heater; a puff detection sensor configured to detect a user's puff; and a controller configured to reset the puff detection sensor based on whether the aerosol generating device is in use or not.

The aerosol generating device further includes a main body; a cartridge that accommodates the aerosol generating material and is detachably coupled to the main body; a slider movably coupled to the main body, and configured to cover an end of the cartridge at a first position and expose the end of the cartridge at a second position; and a position detection sensor configured to detect a position of the slider, wherein the controller determines that the aerosol generating device is in use based on the position detection sensor detecting that the slider is at the second position.

The controller preheats the heater, in response to determining that the aerosol generating device is in use.

The aerosol generating device further includes a display, wherein the controller controls the display to display remaining capacity of the battery in response to determining that the aerosol generating device is in use.

The controller resets the baseline of the puff detection sensor in response to determining that the aerosol generating device is in use.

The puff detection sensor includes a pressure sensor, wherein the controller resets a reference value of the pressure sensor in response to determining that the aerosol generating device is in use.

The controller resets at least one of other electronic devices included in the aerosol generating device, in response to in response to determining that the aerosol generating device is in use.

According to another aspect of the present disclosure, an operation method of an aerosol generating device may include: detecting whether the aerosol generating device is in use or not; and resetting a puff detection sensor configured to detect a user's puff, in response to detecting that the aerosol generating device is in use.

The aerosol generating device may include a main body; a cartridge that accommodates an aerosol generating material and is detachably coupled to the main body; a slider movably coupled to the main body and configured to cover an end of the cartridge at a first position and expose the end of the cartridge at a second position; and a position detection sensor configured to detect a position of the slider, and the detecting may include detecting that the aerosol generating device is in use based on the slider being at the second position.

The operation method of the aerosol generating device further includes preheating a heater configured to heat an aerosol generating material, in response to detecting that the aerosol generating device is in use.

According to another aspect of the present disclosure, a recording medium has recorded thereon a computer program for executing the operation method of the aerosol generating device.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 containing the aerosol generating material may be coupled to the main body 10. A portion of the cartridge 20 may be inserted into an accommodation space 19 of the main body 10 so that the cartridge 20 may be coupled to the main body 10.

The cartridge 20 may contain an aerosol generating material in at least one of, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The cartridge 20 is operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, in response to receiving the electrical signal from the main body 10, the cartridge 20 may convert the phase of the aerosol generating material by heating the aerosol generating material, using, for example, an ultrasonic vibration method or an induction heating method. In an embodiment, the cartridge 20 may include its own power source and generate aerosol based on an electric control signal or a wireless signal received from the main body 10.

The cartridge 20 may include a liquid storage 21 accommodating the aerosol generating material therein, and an atomizer performing a function of converting the aerosol generating material of the liquid storage 21 to aerosol.

When the liquid storage 21 "accommodates the aerosol generating material" therein, it means that the liquid storage 21 functions as a container simply holding an aerosol generating material and that the liquid storage 21 includes therein an element containing an aerosol generating material, such as a sponge, cotton, fabric, or porous ceramic structure.

The atomizer may include, for example, a liquid delivery element (e.g., wick) for absorbing the aerosol generating material and maintaining the same in an optimal state for conversion to aerosol, and a heater heating the liquid delivery element to generate aerosol.

The liquid delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like. Also, the heater may be implemented by a conductive filament using a material such as a nichrome wire, and may be wound around or arranged adjacent to the liquid delivery element.

In addition, the atomizer may be implemented by a heating element in the form of a mesh or plate, which absorbs the aerosol generating material and maintains the same in an optimal state for conversion to aerosol, and generates aerosol by heating the aerosol generating material. In this case, a separate liquid delivery element may not be required.

At least a portion of the liquid storage 21 of the cartridge 20 may include a transparent portion so that the aerosol generating material accommodated in the cartridge 20 may be visually identified from the outside. The liquid storage 21 includes a protruding window 21a protruding from the liquid storage 21, so that the liquid storage 21 may be inserted into a groove 11 of the main body 10 when coupled to the main body 10. A mouthpiece 22 and/or the liquid storage 21 may be entirely formed of transparent plastic or glass. Alternatively, only the protruding window 21a may be formed of a transparent material.

The main body 10 includes a connection terminal 10t arranged inside the accommodation space 19. When the liquid storage 21 of the cartridge 20 is inserted into the accommodation space 19 of the main body 10, the main body 10 may provide power to the cartridge 20 or supply a signal related to an operation of the cartridge 20 to the cartridge 20, through the connection terminal 10t.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22a for discharging aerosol generated from the aerosol generating material inside the liquid storage 21 to the outside.

The slider 7 is coupled to the main body 10 in such a way that the slider 7 may move along the main body 10. The slider 7 covers or exposes at least a portion of the mouthpiece 22 of the cartridge 20 coupled to the main body 10 by moving with respect to the main body 10. The slider 7 includes an elongated hole 7a exposing at least a portion of the protruding window 21a of the cartridge 20 to the outside.

As shown FIG. 1, the slider 7 may have a shape of a hollow container with both ends opened, but the structure of the slider 7 is not limited thereto. For example, the slider 7 may have a bent plate structure having a clip-shaped cross-section, which is movable with respect to the main body 10 while being coupled to an edge of the main body 10. In another example, the slider 7 may have a curved semi-cylindrical shape with a curved arc-shaped cross section.

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies 8a facing each other, and two second magnetic bodies 8b facing each other. The first magnetic bodies 8a may be spaced apart from the second magnetic bodies 8b in a longitudinal direction of the main body 10 (i.e., the direction in which the main body 10 extends), which is a moving direction of the slider 7.

The main body 10 includes a fixed magnetic body 9 arranged on a path along which the first magnetic bodies 8a and the second magnetic bodies 8b of the slider 7 move as the slider 7 moves with respect to the main body 10. Two fixed magnetic bodies 9 of the main body 10 may be mounted to face each other with the accommodation space 19 therebetween.

Depending on the position of the slider 7, an end of the mouthpiece 22 is covered or exposed by a magnetic force acting between the fixed magnetic body 9 and the first magnetic body 8a or between the fixed magnetic body 9 and the second magnetic body 8b.

The main body 10 includes a position change detecting sensor 3 arranged on the path along which the first magnetic body 8a and the second magnetic body 8b of the slider 7 move as the slider 7 moves with respect to the main body 10. The position change detecting sensor 3 may include, for example, a Hall integrated circuit (IC) that uses the Hall effect to detect a change in a magnetic field, and may generate a signal based on the detected change.

In the aerosol generating device 5 according to the above-described embodiments, horizontal cross sections of the main body 10, the cartridge 20, and the slider 7 have approximately rectangular shapes (i.e., when viewed in the longitudinal direction), but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly, and may be curved in a streamlined shape or bent at a preset angle in a specific area to be easily held by the user.

Figure 2:
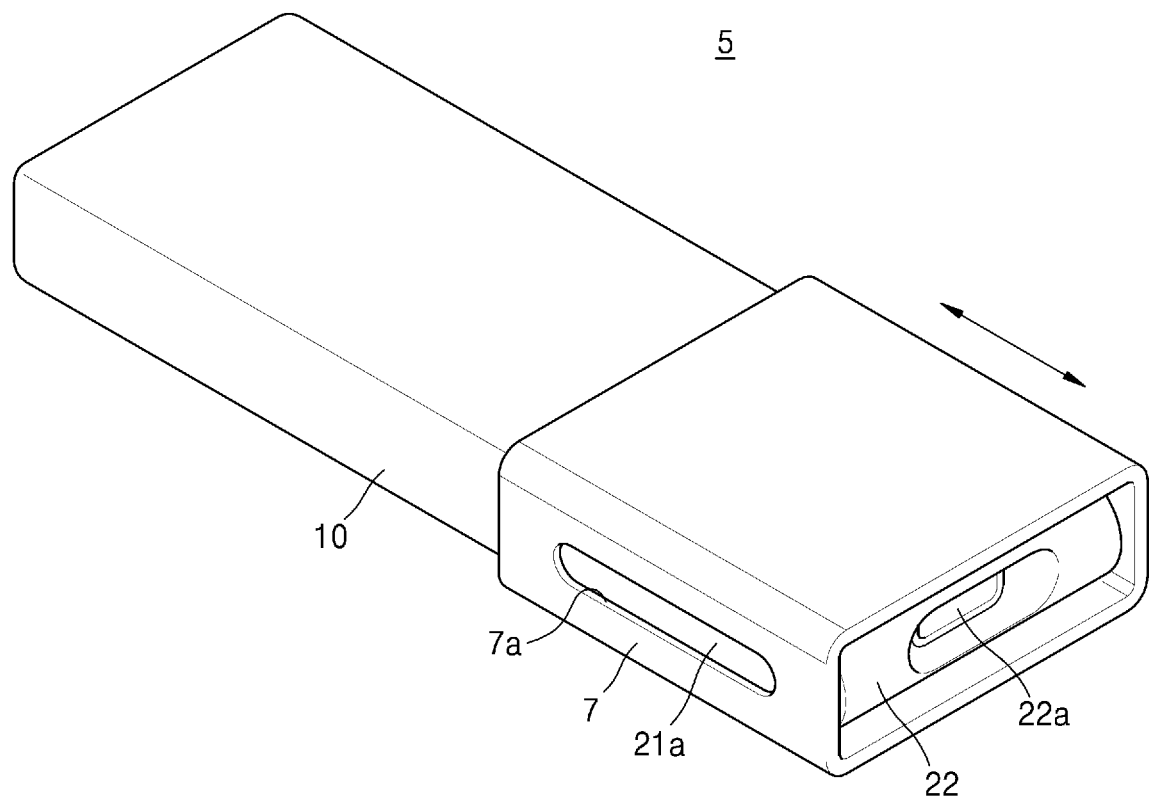
FIG. 2 is a perspective view of an exemplary operating state of the aerosol generating device according to the embodiment illustrated in FIG. 1.

FIG. 2 is a perspective view of an exemplary operating state of the aerosol generating device according to the embodiment illustrated in FIG. 1.

In FIG. 2, the slider 7 is moved to a position where the end of the mouthpiece 22 of the cartridge coupled to the main body 10 is covered. In this state, the mouthpiece 22 may be safely protected from external impurities and kept clean.

The user may check the remaining amount of aerosol generating material contained in the cartridge by visually checking the protruding window 21a of the cartridge through the elongated hole 7a of the slider 7. The user may move the slider 7 in the longitudinal direction of the main body 10 to use the aerosol generating device 5.

Figure 3:
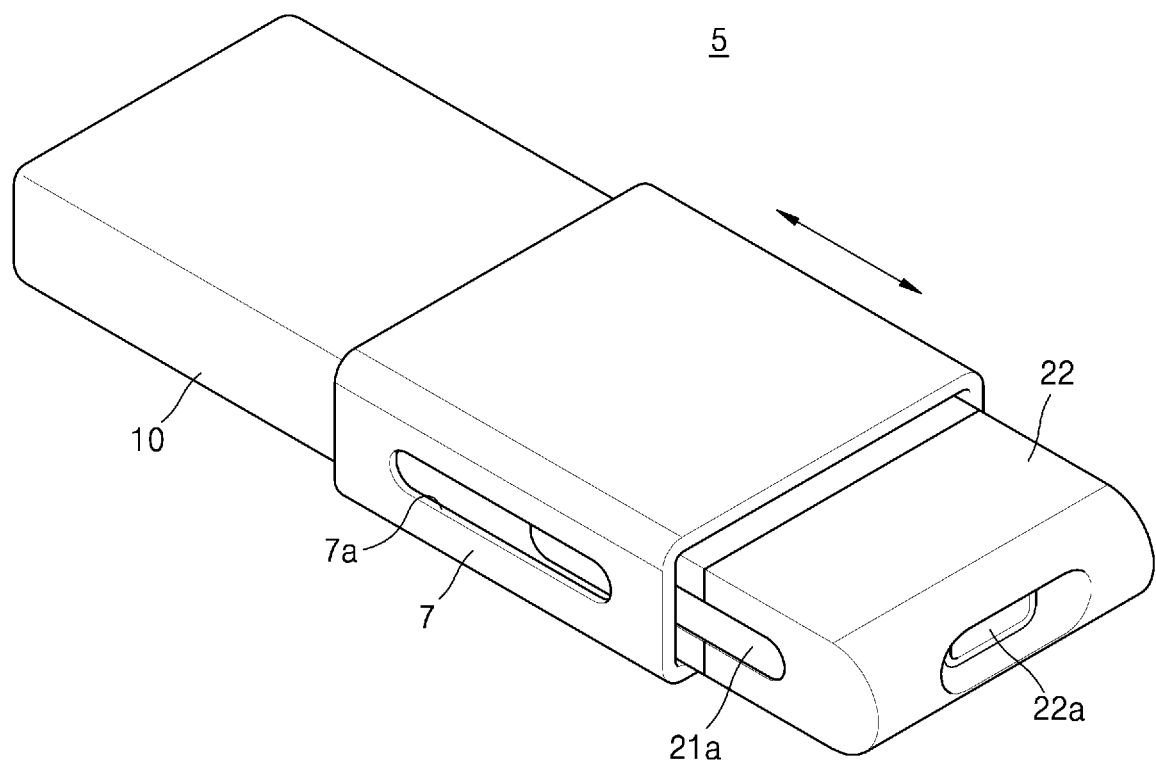
FIG. 3 is a perspective view of another exemplary operating state of the aerosol generating device according to the embodiment illustrated in FIG. 1.

FIG. 3 is a perspective view of another exemplary operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In this state, the user may insert the mouthpiece 22 into his or her mouth and inhale aerosol discharged through the discharge hole 22a of the mouthpiece 22.

As shown in FIG. 3, the protruding window 21a of the cartridge is still exposed to the outside through the elongated hole 7a of the slider 7 when the slider 7 is moved to the position where the end of the mouthpiece 22 is exposed to the outside. Thus, the user may visually check the remaining amount of aerosol generating material contained in the cartridge, regardless of the position of the slider 7.

Referring to FIG. 1, the aerosol generating device 5 may include the position change detecting sensor 3. The position change detecting sensor 3 may detect a position change of the slider 7.

According to an embodiment, the position change detecting sensor 3 may detect a change in magnetization of a magnetic material or a direction, intensity, or the like of a magnetic field. The slider 7 may include a magnet, and the position change detecting sensor 3 may detect a movement of the magnet included in the slider 7.

For example, the position change detecting sensor 3 may include a Hall effect sensor, a rotating coil, a magnetoresistor, or a superconducting quantum interference device (SQUID). However, embodiments of the present disclosure are not limited thereto.

As described above, the position change detecting sensor 3 may detect a change in the intensity of the magnetic field according to an embodiment. However, embodiments of the present disclosure are not limited thereto. A variety of types of sensors such as an electric or mechanical sensor may be used.

Hereinafter, a position at which the slider 7 covers an end portion of the mouthpiece 22 will be referred to as a first position as illustrated in FIG. 2, and a position at which the slider 7 exposes an end portion of the mouthpiece 22 to the outside will be referred to as a second position as illustrated in FIG. 3. Since the slider 7 is slidably coupled to the main body 10, the user may move the slider 7 between the first position and the second position. The position change detecting sensor 3 may detect a change in the position of the slider 7 moving between the first position and the second position.

According to an embodiment, when the slider 7 is moved from the first position to the second position, a controller of the aerosol generating device 5 may receive an input signal from the position change detecting sensor 3. The controller may set the mode of the aerosol generating device 5 to a preheating mode, in response to the input signal.

In addition, the controller may determine whether the cartridge 20 is coupled to the main body 10. The aerosol generating device 5 may be provided with a separate sensor for detecting whether the cartridge 20 and the main body 10 are coupled to each other. Alternatively, the controller may determine whether the cartridge 20 is coupled to the main body 10 by periodically applying current to a circuit inside the main body 10 that is electrically connected to a heater of the cartridge 20 and receiving an output value.

According to an embodiment, after the cartridge 20 is coupled to the main body 10, the controller may set the mode of the aerosol generating device 50 to the preheating mode, in response to the input signal from the position change detecting sensor 3. In the case where it has been determined that the cartridge 20 is not coupled to the main body 10, even if the controller receives the input signal from the position change detecting sensor 3, the controller may not set the mode of the aerosol generating device 5 to the preheating mode.

In addition, the controller may switch the mode of the aerosol generating device 5 to a sleep mode based on the position change of the slider 7. According to an embodiment, when the slider 7 is moved from the second position to the first position, the controller may receive the input signal from the position change detecting sensor 3 to set the mode of the aerosol generating device 5 to the sleep mode.

Figure 4:
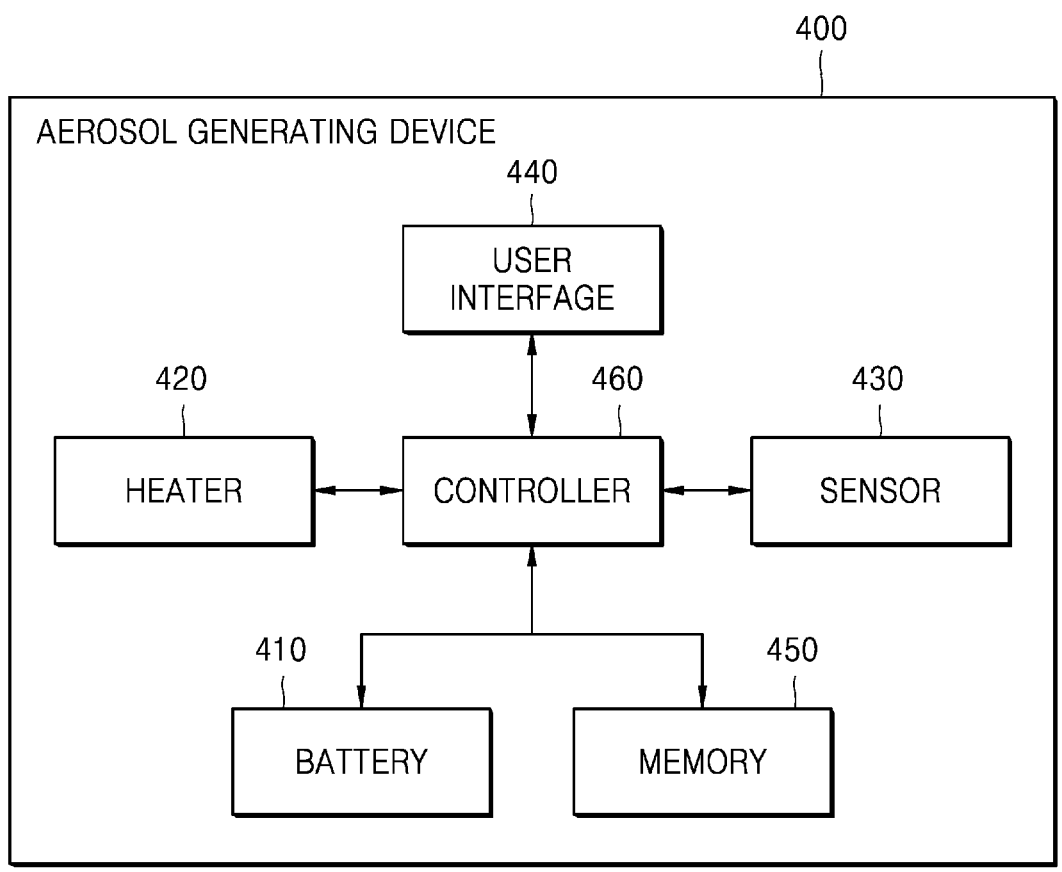
FIG. 4 is a block diagram illustrating hardware components of the aerosol generating device according to an embodiment.

FIG. 4 is a block diagram illustrating hardware components of the aerosol generating device according to an embodiment.

Referring to FIG. 4, the aerosol generating device 400 may include a battery 410, a heater 420, a sensor 430, a user interface 440, a memory 450, and a controller 460. However, the internal structure of the aerosol generating device 400 is not limited to the structures illustrated in FIG. 4. According to the design of the aerosol generating device 400, it will be understood by one of ordinary skill in the art that some of the hardware components shown in FIG. 4 may be omitted or new components may be added.

In an embodiment, the aerosol generating device 400 may consist of only a main body without a cartridge. In this case, the components of the aerosol generating device 400 may be located in the main body. In another embodiment, the aerosol generating device 400 may include a main body and a cartridge, and the components of the aerosol generating device 400 may be distributed between the main body and the cartridge. Alternatively, at least some of the components of the aerosol generating device 400 may be located in both the main body and the cartridge.

Hereinafter, an operation of each of the components will be described without limiting the location of each component.

The battery 410 supplies electric power to be used for the aerosol generating device 400 to operate. In other words, the battery 410 may supply power such that the heater 420 may be heated. In addition, the battery 410 may supply power required for operation of other components included in the aerosol generating device 400, such as the sensor 430, the user interface 440, the memory 450, and the controller 460. The battery 410 may be a rechargeable battery or a disposable battery. For example, the battery 410 may be a lithium polymer (LiPoly) battery, but is not limited thereto.

The heater 420 receives power from the battery 410 under the control of the controller 460. The heater 420 may receive power from the battery 410 and heat a cigarette inserted into the aerosol generating device 400, or heat the cartridge coupled to the aerosol generating device 400.

The heater 420 may be located in the main body of the aerosol generating device 400. Alternatively, the heater 420 may be located in the cartridge. When the heater 420 is located in the cartridge, the heater 420 may receive power from the battery 410 located in the main body and/or the cartridge.

The heater 420 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 420 may be implemented by a metal wire, a metal plate on which an electrically conductive track is arranged, or a ceramic heating element, but is not limited thereto.

In an embodiment, the heater 420 may be a component included in the cartridge. The cartridge may include the heater 420, the liquid delivery element, and the liquid storage. The aerosol generating material accommodated in the liquid storage may be absorbed and transferred by the liquid delivery element, and the heater 420 may heat the aerosol generating material absorbed by the liquid delivery element, thereby generating aerosol. For example, the heater 420 may include a material such as nickel or chromium and may be wound around or arranged adjacent to the liquid delivery element.

In another embodiment, the heater 420 may heat the cigarette inserted into the accommodation space of the aerosol generating device 400. As the cigarette is accommodated in the accommodation space of the aerosol generating device 400, the heater 420 may be located inside and/or outside the cigarette. Accordingly, the heater 420 may generate aerosol by heating the aerosol generating material in the cigarette.

Meanwhile, the heater 420 may include an induction heater. The heater 430 may include an electrically conductive coil for heating a cigarette or the cartridge by an induction heating method, and the cigarette or the cartridge may include a susceptor which may be heated by the induction heater.

The aerosol generating device 400 may include at least one sensor 430. A sensing result from the at least one sensor 430 is transmitted to the controller 460, and the controller 460 may control the aerosol generating device 400 to perform various functions such as controlling the operation of the heater, restricting smoking, determining whether a cigarette (or a cartridge) is inserted, and displaying a notification, according to the sensing result.

For example, the at least one sensor 430 may include a puff detecting sensor. The puff detecting sensor may detect a user's puff based on a temperature change, a flow change, a voltage change, and/or a pressure change.

In addition, the at least one sensor 430 may include a temperature sensor. The temperature sensor may detect a temperature at which the heater 420 (or an aerosol generating material) is heated. The aerosol generating device 400 may include a separate temperature sensor for sensing a temperature of the heater 420, or the heater 420 itself may serve as a temperature sensor instead of including a separate temperature sensor. Alternatively, a separate temperature sensor may be included in the aerosol generating device 400 while the heater 420 is also capable of detecting as a temperature sensor.

In addition, the at least one sensor 430 may include a position change detecting sensor. The position change detecting sensor may detect a change in a position of the slider that is slidably coupled to the main body.

The user interface 440 may provide the user with information about the state of the aerosol generating device 400. The user interface 440 may include various interfacing devices, such as a display or a light emitter for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and communication interfacing modules for performing wireless communication (for example, Wi-Fi, Wi-Fi direct, Bluetooth, near-field communication (NFC), etc.) with external devices.

However, the aerosol generating device 400 may be implemented by selecting only some of the above-described various interfacing devices.

The memory 450 may store data processed or to be processed by the controller 460. The memory 450 may include various types of memories, such as dynamic random access memory (DRAM), static random access memory (SRAM), read-only memory (ROM), electrically erasable programmable read-only memory (EEPROM), etc.

The memory 450 may store an operation time of the aerosol generating device 400, the maximum number of puffs, the current number of puffs, at least one temperature profile, data on a user's smoking pattern, etc.

The controller 460 may control overall operations of the aerosol generating device 400. The controller 460 may include at least one processor. A processor can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The controller 460 analyzes a sensing result of the sensor 430, and controls subsequent processes.

The controller 460 may control power supplied to the heater 420 so that the operation of the heater 420 is started or terminated, based on the sensing result of the at least one sensor 430. In addition, based on the sensing result from the at least one sensor 430, the controller 460 may control the amount of power supplied to the heater 420 and the time at which the power is supplied, so that the heater 420 is heated to a predetermined temperature or maintained at an appropriate temperature.

According to an embodiment, the aerosol generating device 400 may include a plurality of modes. For example, the aerosol generating device 400 may include a preheating mode, an operation mode, an idle mode, and a sleep mode. However, embodiments of the present disclosure are not limited thereto.

When the aerosol generating device 400 is not used, the aerosol generating device 400 may maintain the sleep mode, and the controller 460 may control output current of the battery 410 for electric power not to be supplied to the heater 420 in the sleep mode. Before or after the aerosol generating device 400 is used, the aerosol generating device 400 may operate in the sleep mode.

The controller 460 may set the mode of the aerosol generating device 400 to the preheating mode (e.g., switch from the sleep mode to the preheating mode) to start the operation of the heater 420 after receiving a user input for the aerosol generating device 400.

In addition, the controller 460 may switch the mode of the aerosol generating device 400 from the preheating mode to a heating mode after detecting the user's puff, using the puff detecting sensor.

When the aerosol generating device 400 has operated in the heating mode for longer than a preset time, the controller 460 may switch the mode of the aerosol generating device 400 from the heating mode to the idle mode.

In addition, the controller 460 may count the number of puffs using the puff detecting sensor. If the number of puffs reaches a predetermined maximum number, the controller 460 may suspend supplying electric power to the heater 420.

A temperature profile may be set for each of the preheating mode, the operation mode, and the idle mode. The controller 460 may control electric power supplied to the heater 420 based on an electric power profile for each mode so that the aerosol generating material is heated according to the temperature profile for each mode.

The controller 460 may control the user interface 440 based on the result sensed by at least one sensor 430. For example, after counting the number of puffs, using the puff detecting sensor, if the current number of puffs reaches the preset number, the controller 460 may use a lamp, a motor, and/or a speaker to notify the user that the aerosol generating device 400 will be terminated soon. According to an embodiment, the preset number may be set by subtracting a certain number (e.g., one) from the predetermined maximum number. For example, if the maximum number is set to ten and the number of puffs counted by the puff detecting sensor reaches nine, the controller 460 may use at least one of the lamp, the motor, and the speaker to notify the user that the aerosol generating device 400 will be terminated soon.

In addition, when the number of puffs is counted using the puff detecting sensor, if the current number of puffs reaches the maximum number of puffs, the controller 460 may end the operation of the heater 420. For example, when the current number of puffs reaches the maximum number of puffs, the controller 460 may set the mode of the aerosol generating device 400 to the sleep mode.

Although not illustrated in FIG. 4, an aerosol generating system may be configured by the aerosol generating device 400 and a separate cradle. For example, the cradle may be used to charge the battery 410 of the aerosol generating device 400. For example, the aerosol generating device 400 may be supplied with power from a battery of the cradle to charge the battery 410 of the aerosol generating device 400 while being accommodated in an accommodation space of the cradle.

Figure 5:
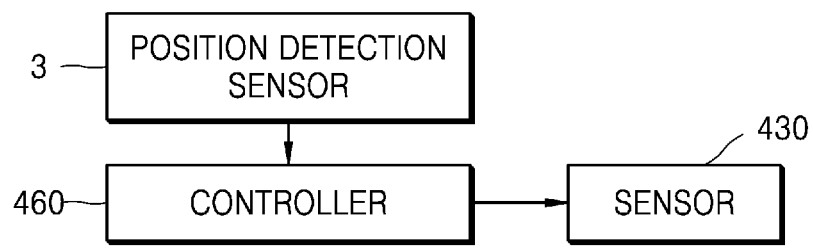
FIG. 5 is a schematic diagram of an aerosol generating device, according to an embodiment.

FIG. 5 is a schematic diagram of an aerosol generating device, according to an embodiment of the present disclosure.

With reference to FIG. 5, descriptions that are same as those of FIG. 4 will be omitted, and the following descriptions will be focused on the difference.

Referring to FIG. 5, a position detection sensor 3 detects whether the aerosol generating device is being used or not. In an embodiment, the position detection sensor 3 may be the position change detection sensor illustrated in FIG. 1, and may determine whether the user actually intends to use or is currently using the aerosol generating device (i.e., whether the aerosol generating device is in use) based on whether an end of the mounted cartridge is exposed or not. For example, the position detection sensor 3 determines whether the slider 7 illustrated in FIG. 1 is in a first position covering an end of the cartridge or in a second position exposing the end of the cartridge. If the user lowers the slider to the second position, it may indicate that the user is about to use the aerosol generating device (i.e., about to inhale aerosol). Thus, when the slider is located at the second position, the position detection sensor 3 outputs a sensing signal to the controller 460.

Although it is describe above that actual use of the aerosol generating device is determined based on the position of the slider, embodiments of the present disclosure are not limited thereto. For example, whether the aerosol generating device is in use or not may be determined based on detection of user's other manipulation such as opening the cover (e.g., the slider 7) or turning on the aerosol generating device.

When the sensing signal is output from the position detection sensor 3, the controller 460 may reset the sensor 430 that recognizes the user's puff, in response to the sensing signal. The meaning of 'reset' here includes resetting or updating the baseline of the sensor 430.

The sensor 430 may include a puff detection sensor. The puff detection sensor may detect the user's puff, based on a temperature change, a flow change, a voltage change, a pressure change, etc. For example, a reference value used by the puff detection sensor to determine whether a puff occurs or not may be reset or updated. Since an aerosol generating device generates heat by heating a heater, its internal temperature change may be significant. Such significant internal temperature change greatly affects reference values of the sensor, and accordingly, malfunction or errors may occur. Therefore, it is necessary to reset or update the reference values (i.e. baselines). Accordingly, in an embodiment of the present disclosure, unnecessary power consumption may be reduced by resetting the sensor only when the aerosol generating device is in use (i.e., only when a user is manipulating the aerosol generating device).

For example, the puff detection sensor may be a pressure sensor, and the reference value of the pressure sensor may be updated. In addition, the controller 460 may preheat the heater, in response to the sensing signal from the position detection sensor 3. The preheating of the heater may rapidly raise the temperature of the heater up to the temperature at which aerosol is generated, thereby generating a uniform atomization amount from a first puff.

Moreover, the controller 460 may display remaining capacity of the battery using the user interface 440 (e.g., a light emitting diode (LED)), in response to the sensing signal from the position detection sensor 3.

Furthermore, the controller 460 may reset other electronic devices or sensors within the aerosol generating device, in response to the sensing signal from the position detection sensor 3. Also, the controller 460 may switch the aerosol generating device from a wake up mode to a sleep mode.

As such, unnecessary power consumption may be reduced by resetting the sensor, preheating the heater, displaying the remaining capacity of the battery, or resetting other electronic devices or sensors at the time when the user is actually about to use the aerosol generating device.

Figure 6:
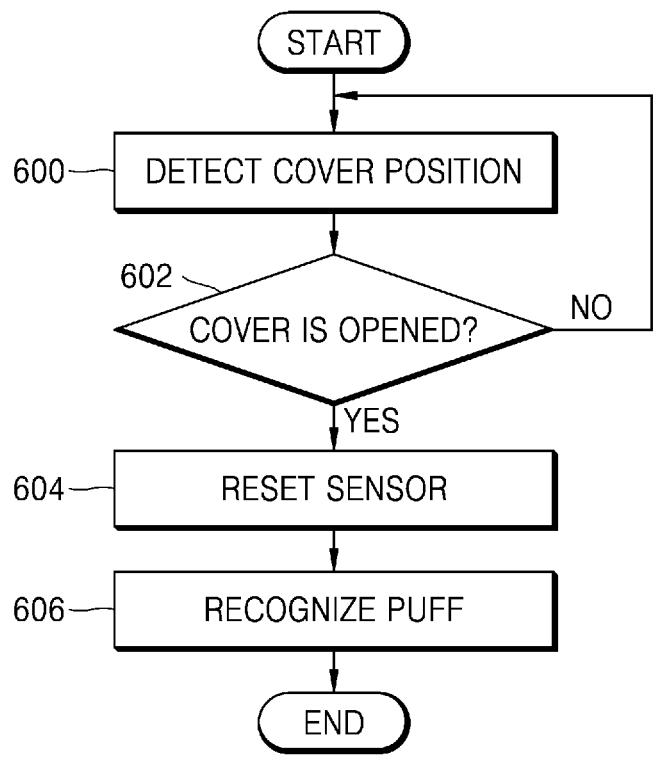
FIG. 6 is a flowchart of a method of generating aerosol, according to an embodiment.

FIG. 6 is a flowchart of a method of generating aerosol, according to an embodiment.

Referring to FIG. 6, the position of a cover (e.g., the slider 7) is detected in operation 600. It is determined whether the cover is opened or not, in operation 602. If the cover is opened (e.g., the slider 7 is at the second position as shown in FIG. 3), it may indicate that the user is actually about to use (or currently using) the aerosol generating device. In the foregoing embodiments, it has been described that the case where the slider 7 is moved to the second position and an end of the cartridge is opened indicates that the aerosol generating device is in use. However, if a cover other than the slider 7 is opened and the end of the cartridge is exposed, it may also indicate that the aerosol generating device is in use.

When the cover is opened, the sensor 430 is reset such that a reference value for recognizing a puff is reset, in operation 604.

The sensor 430 may recognize the user's puff based on the reset reference value, in operation 606.

Figure 7:
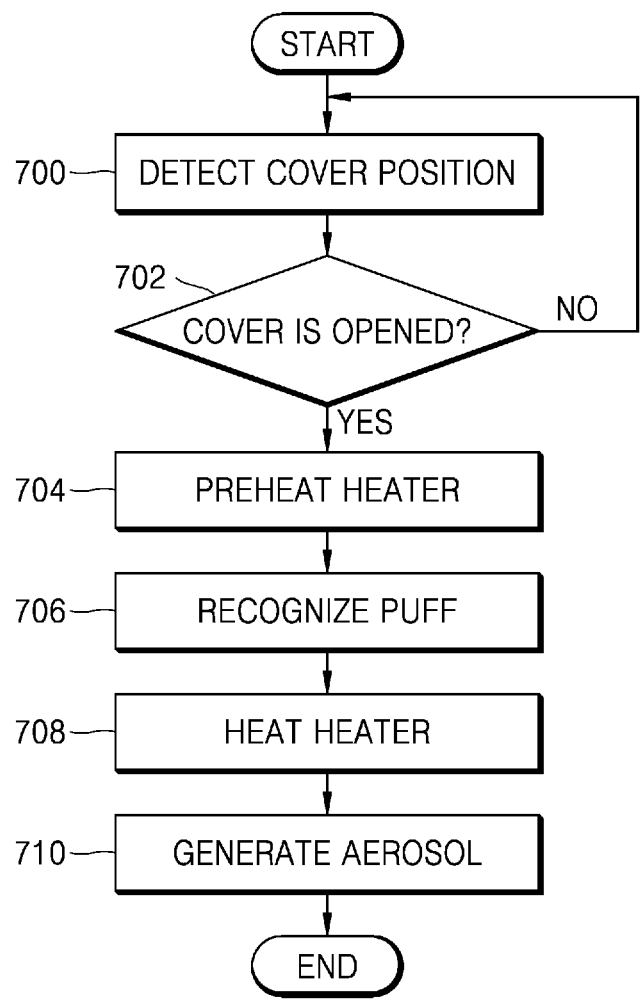
FIG. 7 is a flowchart of a method of generating aerosol, according to another embodiment.

FIG. 7 is a flowchart of a method of generating aerosol, according to another embodiment.

Referring to FIG. 7, the position of the cover is detected, in operation 700. It is determined whether the cover is opened or not, in operation 702. If the cover is opened, it may indicate that the user is actually about to use (or currently using) the aerosol generating device.

Thus, if the cover is opened, the heater is preheated in operation 704. Also, the sensor 430 may recognize a puff in operation 706. Although not illustrated in FIG. 7, the method may include an operation of resetting the sensor 430, before operation 704.

When the puff is recognized, the heater is preheated in operation 708. As a result, aerosol may be generated in operation 710.

An embodiment may also be implemented in the form of a recording medium including instructions executable by a computer, such as a program module executed by a computer. Examples of computer readable media may include any available media that is able to be accessed by a computer and both volatile and non-volatile media, and removable and non-removable media. The computer readable media may also include both computer storage media and communication media. The computer storage media includes both of volatile and non-volatile, removable and non-removable media implemented in any method or by any technology for storage of information, such as computer readable instructions, data structures, program modules, or other data. The communication media typically includes computer readable instructions, data structures, program modules, other data in a modulated data signal, or other transmission mechanism, and also includes any information delivery media.

At least one of the components, elements, modules or units (collectively "components" in this paragraph) represented by a block in the drawings such as the controller 460 in FIGS. 4-5 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:
   a main body;
   a cartridge that accommodates an aerosol generating material and is detachably coupled to the main body;
   a heater configured to heat the aerosol generating material;
   a battery configured to supply power to the heater;
   a puff detection sensor configured to detect a user's puff;
   a slider movably coupled to the main body, and configured to cover an end of the cartridge at a first position and expose the end of the cartridge at a second position;
   a position detection sensor configured to detect a position of the slider, and
   a controller configured to determine that the aerosol generating device is in use if the position detection sensor detects that the slider is at the second position and reset the puff detection sensor based on the aerosol generating device being in use.

2. The aerosol generating device of claim 1, wherein the controller is further configured to preheat the heater in response to determining that the aerosol generating device is in use.

3. The aerosol generating device of claim 1, further comprising a display,
   wherein the controller is further configured to control the display to display remaining capacity of the battery in response to determining that the aerosol generating device is in use.

4. The aerosol generating device of claim 1, wherein the controller is further configured to reset a baseline of the puff detection sensor in response to determining that the aerosol generating device is in use.

5. The aerosol generating device of claim 1, wherein the puff detection sensor includes a pressure sensor, and
   wherein the controller is further configured to reset a reference value of the pressure sensor in response to determining that the aerosol generating device is in use.

6. The aerosol generating device of claim 1, wherein the controller is further configured to reset at least one of other sensors included in the aerosol generating device in response to determining that the aerosol generating device is in use.

7. An operation method of an aerosol generating device comprising a main body, a cartridge that accommodates an aerosol generating material and is detachably coupled to the main body, a slider movably coupled to the main body and configured to cover an end of the cartridge at a first position and expose the end of the cartridge at a second position, and a position detection sensor configured to detect the position of the slider, the method comprising:
   detecting that the aerosol generating device is in use if the position detection sensor detects that the slider is at the second position; and
   resetting a puff detection sensor configured to detect a user's puff, in response to detecting that the aerosol generating device is in use.

8. The method of claim 7, further comprising preheating a heater configured to heat the aerosol generating material, in response to detecting that the aerosol generating device is in use.

9. A recording medium having recorded thereon a computer program for executing the operation method of the aerosol generating device, according to claim 7.

* * * * *